(12) United States Patent
Lee et al.

(10) Patent No.: US 7,969,536 B2
(45) Date of Patent: Jun. 28, 2011

(54) ARRAY SUBSTRATE, DISPLAY PANEL HAVING THE SAME AND METHOD OF MANUFACTURING THE SAME

(75) Inventors: Myung-Sub Lee, Seoul (KR); Sun-Kyu Joo, Seoul (KR); Yun-Seok Lee, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/886,524

(22) Filed: Sep. 20, 2010

(65) Prior Publication Data

US 2011/0005063 A1    Jan. 13, 2011

Related U.S. Application Data

(62) Division of application No. 11/856,442, filed on Sep. 17, 2007, now Pat. No. 7,817,227.

(30) Foreign Application Priority Data

Sep. 20, 2006  (KR) .................. 10-2006-0091388

(51) Int. Cl.
   *G02F 1/1335*  (2006.01)
(52) U.S. Cl. ....................................... 349/106
(58) Field of Classification Search .............. 349/106
   See application file for complete search history.

(56) References Cited

U.S. PATENT DOCUMENTS

| 6,577,374 B1 | 6/2003 | Nakata et al. |
| 6,697,138 B2 * | 2/2004 | Ha et al. ........................ 349/114 |
| 6,873,382 B2 | 3/2005 | Chang et al. |
| 7,372,513 B2 * | 5/2008 | Choi ............................... 349/40 |
| 7,440,073 B2 | 10/2008 | Sawasaki |
| 7,812,921 B2 * | 10/2010 | Lee et al. ....................... 349/187 |
| 2003/0104291 A1 | 6/2003 | Yi et al. |
| 2004/0001170 A1 | 1/2004 | Chang et al. |
| 2004/0096756 A1 | 5/2004 | Cheng et al. |
| 2004/0141142 A1 | 7/2004 | Choi et al. |
| 2004/0227895 A1 | 11/2004 | Yoo et al. |
| 2004/0263752 A1 | 12/2004 | Kim |
| 2004/0263754 A1 | 12/2004 | Ahn et al. |
| 2005/0161677 A1 | 7/2005 | Jung et al. |
| 2005/0264741 A1 | 12/2005 | Kim |
| 2006/0017869 A1 | 1/2006 | Lee |
| 2006/0146254 A1 | 7/2006 | Kim |

FOREIGN PATENT DOCUMENTS

| KR | 1020020027727 | 4/2002 |
| KR | 1020040001695 | 1/2004 |
| KR | 1020050070344 | 7/2005 |

OTHER PUBLICATIONS

European Search Report dated Feb. 5, 2009 for EP Application No. 07018164.9.
Non-Final Office Action issued in co-pending U.S. Appl. No. 11/856,442 on Apr. 24, 2009.
Final Office Action issued in co-pending U.S. Appl. No. 11/856,442 on Oct. 21, 2009.
Non-Final Office Action issued in co-pending U.S. Appl. No. 11/856,442 on Dec. 30, 2009.
Notice of Allowance issued in co-pending U.S. Appl. No. 11/856,442 on Jun. 18, 2010.

* cited by examiner

*Primary Examiner* — Charlie Peng
(74) *Attorney, Agent, or Firm* — H.C. Park & Associates, PLC (57) ABSTRACT

In an array substrate, the array substrate includes an insulation member in each pixel area and a color filter layer that surrounds each insulation member. The color filter layer includes color filters having two or more colors that are different from each other, and a color filter is formed in each pixel area. An insulation member is arranged in each pixel area and all the insulation members include the same material. The insulation members are partially removed in each pixel area to form contact holes having the same size.

12 Claims, 14 Drawing Sheets

ARRAY SUBSTRATE, DISPLAY PANEL HAVING THE SAME AND METHOD OF MANUFACTURING THE SAME

CROSS-REFERENCE TO RELATED APPLICATION

This application is a divisional of U.S. application Ser. No. 11/856,442, filed on Sep. 17, 2007, and claims priority from and the benefit of Korean Patent Application No. 10-2006-0091388, filed on Sep. 20, 2006, which are both hereby incorporated by reference for all purposes as if fully set forth herein.

BACKGROUND OF THE INVENTION

1. Field of the Invention

The present invention relates to an array substrate, a display panel including the array substrate, and a method of manufacturing the array substrate. More particularly, the present invention relates to an array substrate having a color filter-on-array (COA) structure, a is display apparatus including the array substrate, and a method of manufacturing the array substrate.

2. Discussion of the Background

In general, a COA-type liquid crystal display panel includes an array substrate, an opposite substrate facing the array substrate, and a liquid crystal layer interposed between the array substrate and the opposite substrate.

The array substrate includes a plurality of pixels that displays an image. Each pixel includes a gate line, a data line, a thin film transistor, a pixel electrode, and a color filter. The gate line and the data line receive a gate signal and a data signal, respectively, and are connected to a gate electrode and a source electrode of the thin film transistor, respectively. The pixel electrode is connected to a drain electrode of the thin film transistor and outputs a pixel voltage. The color filter is arranged under the pixel electrode and displays a predetermined color using a light. The pixel electrode is connected to the drain electrode of the thin film transistor through a contact hole formed in the color filter.

The color filter may be a red filter, a green filter, or a blue filter. Since the material characteristics of the red, green, and blue filters are different from each other, the exposure amount required for a contact hole to be formed through each differs, even though the contact holes are formed under the same process conditions. Thus, the sizes of the contact holes are different in the red, green, and blue filters, and if the size of a contact hole becomes too small, the drain electrode of the thin film transistor may not be exposed. As a result, the thin film transistor and the pixel electrode may be insulated from each other and an abnormal image may be displayed.

SUMMARY OF THE INVENTION

The present invention provides an array substrate that may be capable of improving product yield.

The present invention also provides a display panel including the above array substrate.

The present invention also provides a method for manufacturing the above display panel.

Additional features of the invention will be set forth in the description which follows, and in part will be apparent from the description, or may be learned by practice of the invention.

The present invention discloses an array substrate including a base substrate, thin film transistors, pixel electrodes, insulation members, and a color filter layer. The base substrate includes a plurality of pixel area to display an image and a thin film transistor is arranged in each pixel area. A pixel electrode is arranged in each pixel area and is connected to the thin film transistor. An insulation member is arranged in each pixel area and provided with a contact hole through which the thin film transistor is exposed. The insulation members all include the same material. The color filter layer includes color filters arranged under the pixel electrode to surround the insulation members.

The present invention also discloses a liquid crystal display panel including an array substrate and an opposite substrate facing the array substrate. The array substrate includes a first base substrate, thin film transistors, pixel electrodes, insulation members, and a color filter layer. The first base substrate includes a plurality of pixel areas to display an image. The thin film transistor is arranged in each pixel areas. The pixel electrode is arranged in each pixel area is and is connected to the thin film transistor. The insulation members all include the same material. An insulation member is arranged in each pixel area and is provided with a contact hole through which the thin film transistor is exposed. The color filter layer includes color filters arranged under the pixel electrode to surround the insulation members.

The present invention also discloses a method for manufacturing a display panel including forming a thin film transistor, a first storage electrode, and a second storage electrode in a pixel area of a first base substrate. The second storage electrode is branched from a drain electrode of the thin film transistor and disposed on the first storage electrode. A color filter is formed in the pixel area. A color filter formed on the second storage electrode is removed. A black matrix that including a contact hole is formed on the second storage electrode. A pixel electrode is formed on the color filter and the black matrix such that the pixel electrode is connected to the second storage electrode through the contact hole. A common electrode is formed on a second base substrate. The first base substrate is coupled with the second base substrate.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layer may be present. In contrast, when an element is referred to as being "directly on" or "directly connected to" another element or layer, there are no intervening elements or layers present.

Figure 1:
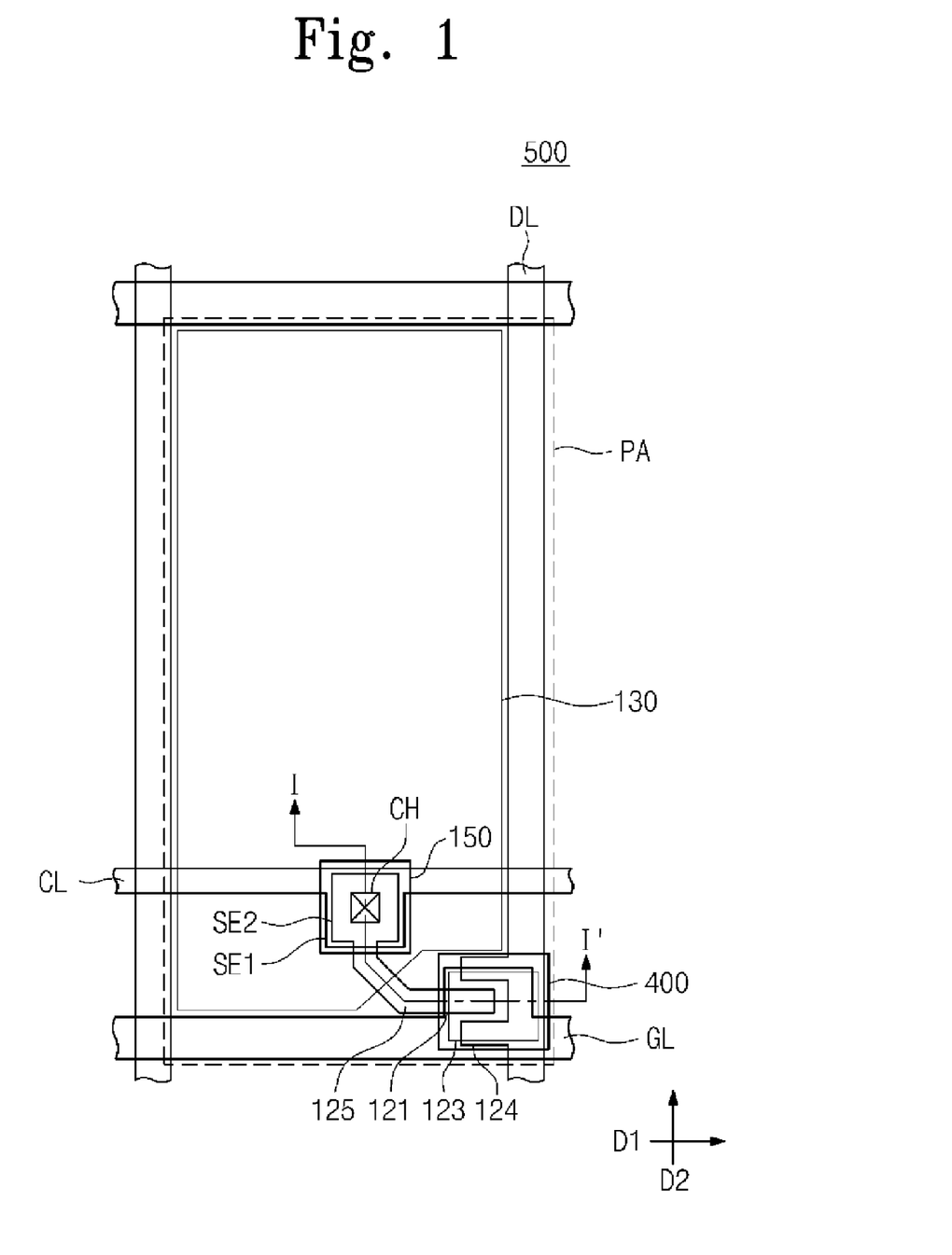
FIG. 1 is a plan view showing a liquid crystal display panel according to an exemplary embodiment of the present invention
Figure 2:
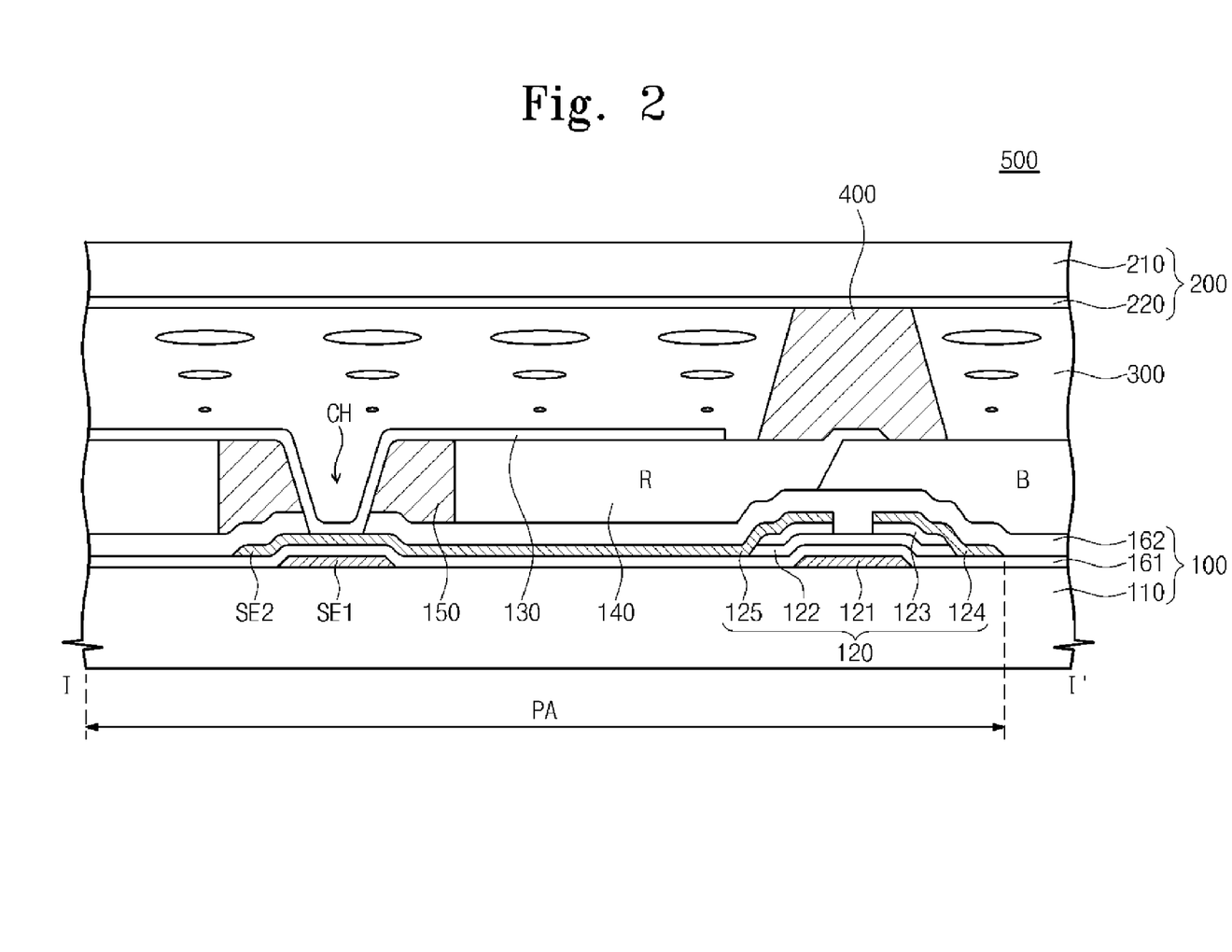
FIG. 2 is a sectional view taken along line I-I' of FIG. 1.

FIG. 1 is a plan view showing a liquid crystal display panel according to an exemplary embodiment of the present invention, and FIG. 2 is a section view taken along line I-I' of FIG. 1.

Referring to FIG. 1 and FIG. 2, a liquid crystal display panel 500 includes an array substrate 100, an opposite substrate 200, and a liquid crystal layer 300.

The array substrate 100 includes a first base substrate 110, a gate line GL, a data line DL, a thin film transistor 120, a pixel electrode 130, a color filter 140, and a black matrix 150.

The first base substrate 110 is divided into a plurality of pixel areas that displays an image.

The gate line GL extends in a first direction D1 on the first base substrate 110 to transmit a gate signal.

The data line DL is insulated from and crosses the gate line GL to transmit a data signal. The data line DL and the gate line GL define a pixel area PA.

The pixel area PA includes the thin film transistor 120, the pixel electrode 130, the color filter 140, and the black matrix 150. The thin film transistor 120 includes a gate electrode 121 branched from the gate line GL, an active layer 122, and an ohmic contact layer 123 sequentially formed on the gate electrode 121, a source electrode 124 branched from the data line DL and formed on the ohmic contact layer 123, and a drain electrode 125 formed from the same layer as the source electrode 124.

The pixel electrode 130 is connected to the drain electrode 125 and outputs a pixel voltage. The pixel electrode 130 includes a transparent conductive material such as indium tin oxide (ITO) or indium zinc oxide (IZO).

The array substrate 100 further includes a gate insulating layer 161 and a protective layer 162 to protect the metal wires. The gate insulating layer 161 is formed on the first base substrate 110 to cover the gate line GL and the gate electrode 121. The protective layer 162 is formed on the gate insulating layer 161 to cover the data line DL, the source electrode 124, and the drain electrode 125.

Also, the array substrate 100 further includes a common voltage line CL to transmit a common voltage, a first storage electrode SE1, and a second storage electrode SE2. The common voltage line CL is formed from the same layer as the gate line GL and extends in the first direction D1. The first storage electrode SE1 is branched from the common voltage line CL. The second storage line SE2 extends from the drain electrode 125 and is arranged on the first storage electrode SE1. The second storage line SE2 is connected to the pixel electrode 130. The gate insulating layer 161 is interposed between the first storage electrode SE1 and the second storage electrode SE2, and serves as a storage capacitor with the first storage electrode SE1 and the second storage electrode SE2.

The color filter 140 is formed on the protective layer 162, and is arranged partially under the pixel electrode 130 and removed from a region corresponding to the second storage electrode SE2. The color filter 140, which displays a predetermined color using light, includes a red, green, or blue color filter and is formed in the pixel area PA. Also, the color filter 140 may be thick enough to planarize the array substrate 100. Thus, in this case, a separate organic insulating layer is not needed to planarize the array substrate 100.

The black matrix 150 is arranged on the second storage electrode SE2 and under the pixel electrode 130. The color filter 140 surrounds the black matrix 150 in a plan view. The is black matrix 150 includes a black organic material to block the light. The black matrix 150 and the protective layer 162 may be partially removed to form a contact hole CH, which exposes the second storage electrode SE2. The pixel electrode 130 is connected to the second storage electrode SE2 through the contact hole CH, so that the drain electrode 125 and the pixel electrode 130 are connected to each other. Since each contact hole CH is formed by removing the black matrix 150 in the corresponding pixel area PA, the contact holes CH in each pixel area PA may be the same size.

In general, the red, green, and blue color filters may have different material characteristics from each other. Thus, although the color filters are etched using the same etching process, the etching amount of each color filter is different. Therefore, when the contact hole CH is formed by removing the color filter 140, the size of the contact hole CH may be different according to the color of the color filter 140.

In order to prevent the above-described disadvantage, the black matrix 150 may be formed in each pixel area PA of the array substrate 100, and then a portion of the black matrix 150 may be removed to form the contact hole CH. Thus, the size of the contact hole CH in each pixel area PA may be the same, so that the pixel electrode 130 may not be insulated from the second storage electrode SE2, thereby improving product yield.

The opposite substrate 200 is arranged on the array substrate 100. The opposite substrate 200 includes a second base substrate 210 coupled with the first base substrate 110 while facing the first base substrate 110 and a common electrode 220 formed on the second base substrate 210. The common electrode 220 includes a transparent conductive material such as ITO, IZO, etc., and provides the common voltage to the liquid crystal layer 300. The liquid crystal layer 300 controls the transmittance of light according to an electric field formed between is the array substrate 100 and the opposite substrate 200.

The liquid crystal display panel 500 further includes a spacer 400 that uniformly maintains a cell gap between the array substrate 100 and the opposite substrate 200. A spacer 400 is formed in each pixel area PA and arranged on the thin film transistor 120. The spacer 400 may include the same material as the black matrix 150 and may be formed through the same process as the black matrix 150. Since each spacer 400 and black matrix 150 may include the same material, the opposite substrate 200 may not require a separate black matrix to prevent the thin film transistor 120 from being recognized from the outside. As a result, the number of manufacturing processes may be decreased and misalignment between the array substrate 100 and the opposite substrate 200 may be prevented.

FIG. 3A, FIG. 3B, FIG. 3C, FIG. 3D, and FIG. 3E are sectional views showing a method of manufacturing the array substrate and the spacer shown in FIG. 2.

Figure 3A:
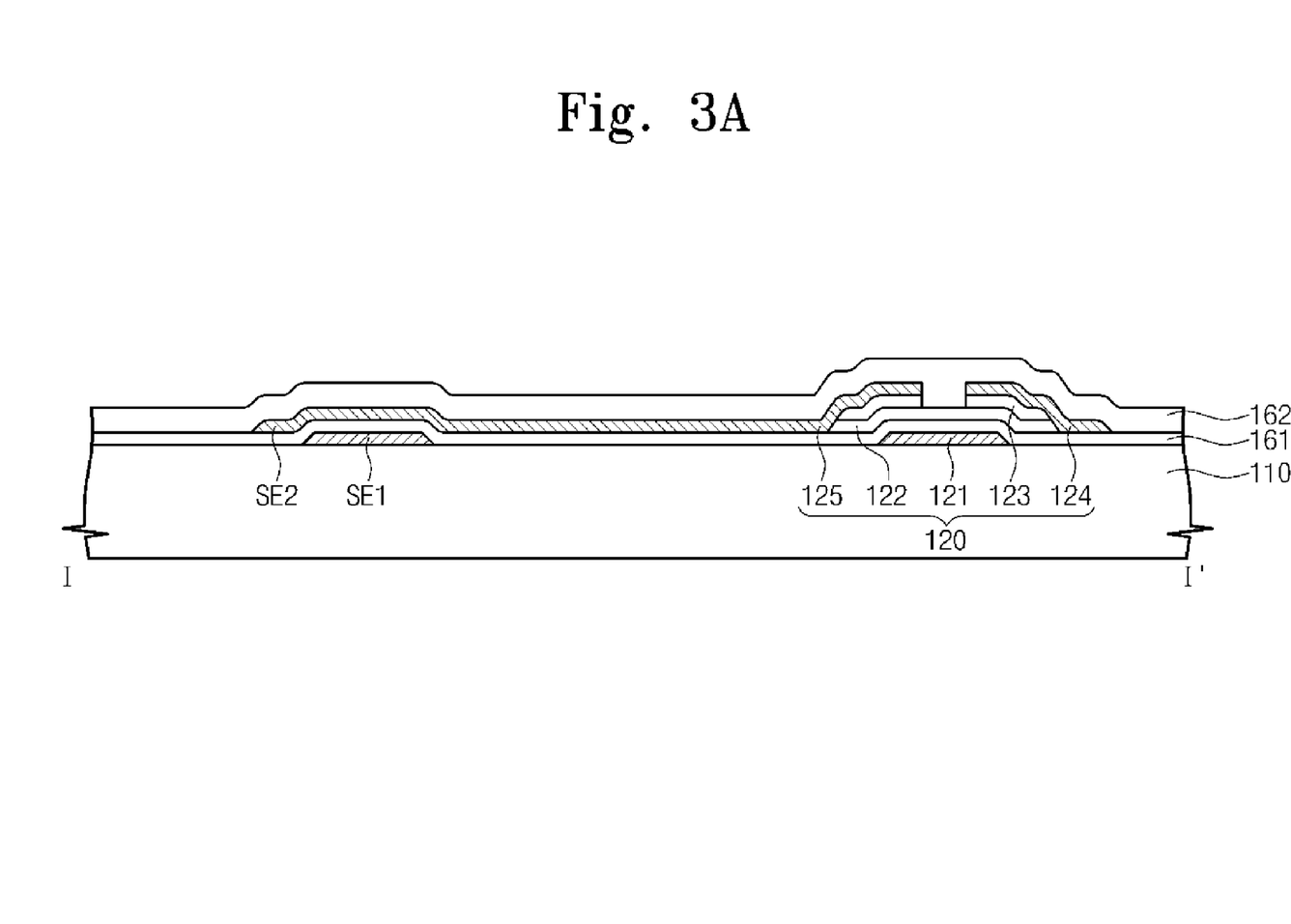
FIG. 3A, FIG. 3B, FIG. 3C, FIG. 3D, and FIG. 3E are sectional views showing a method for manufacturing an array substrate and a spacer shown in FIG. 2.

Referring to FIG. 3A, the gate insulating layer 161, the thin film transistor 120, the first storage electrode SE1, and the second storage electrode SE2 are formed on the first base substrate 110, and the protective layer 162 is formed on the first base substrate 110 to cover the gate insulating layer 161, the thin film transistor 120, the first storage electrode SE1, and the second storage electrode SE2.

Figure 3B:
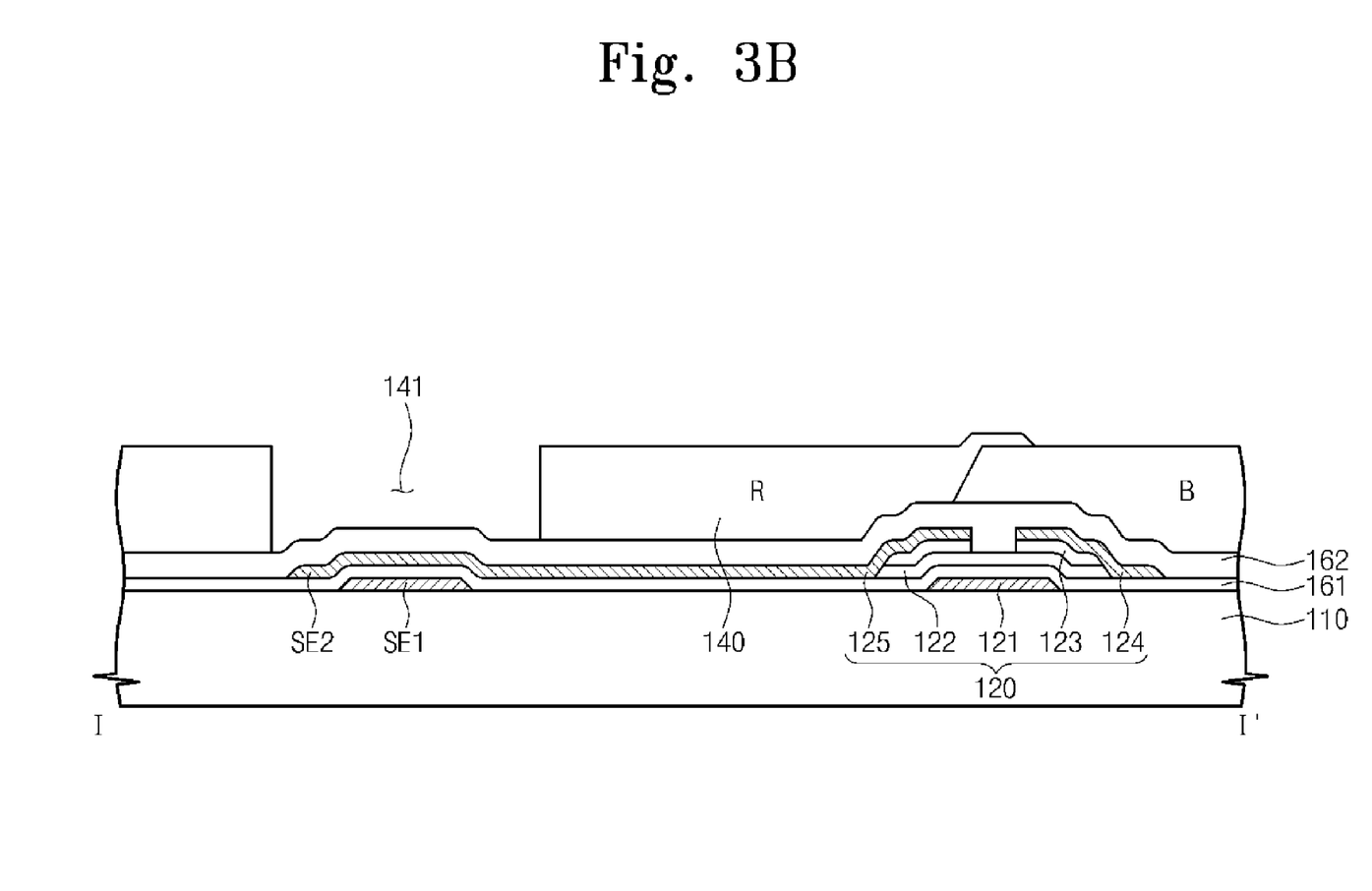

Referring to FIG. 3B, a photoresist layer (not shown) corresponding to the color filter 140 is coated over the protective layer 162 and is patterned to form the color filter 140. While patterning the photoresist layer, the photoresist layer is removed from an area corresponding to the second storage electrode SE2, to provide the color filter 140 with an opening 141.

Figure 3C:
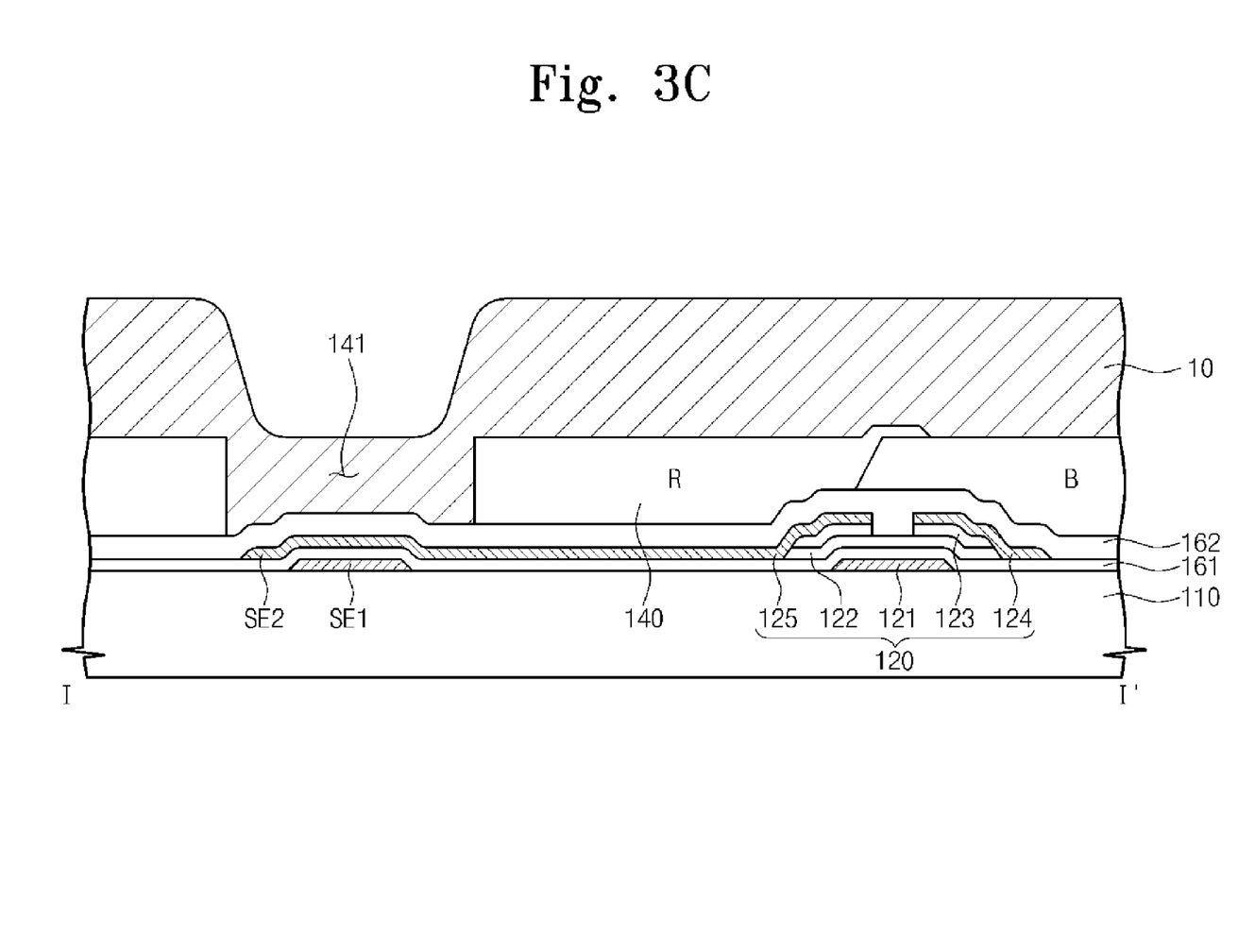
Figure 3D:
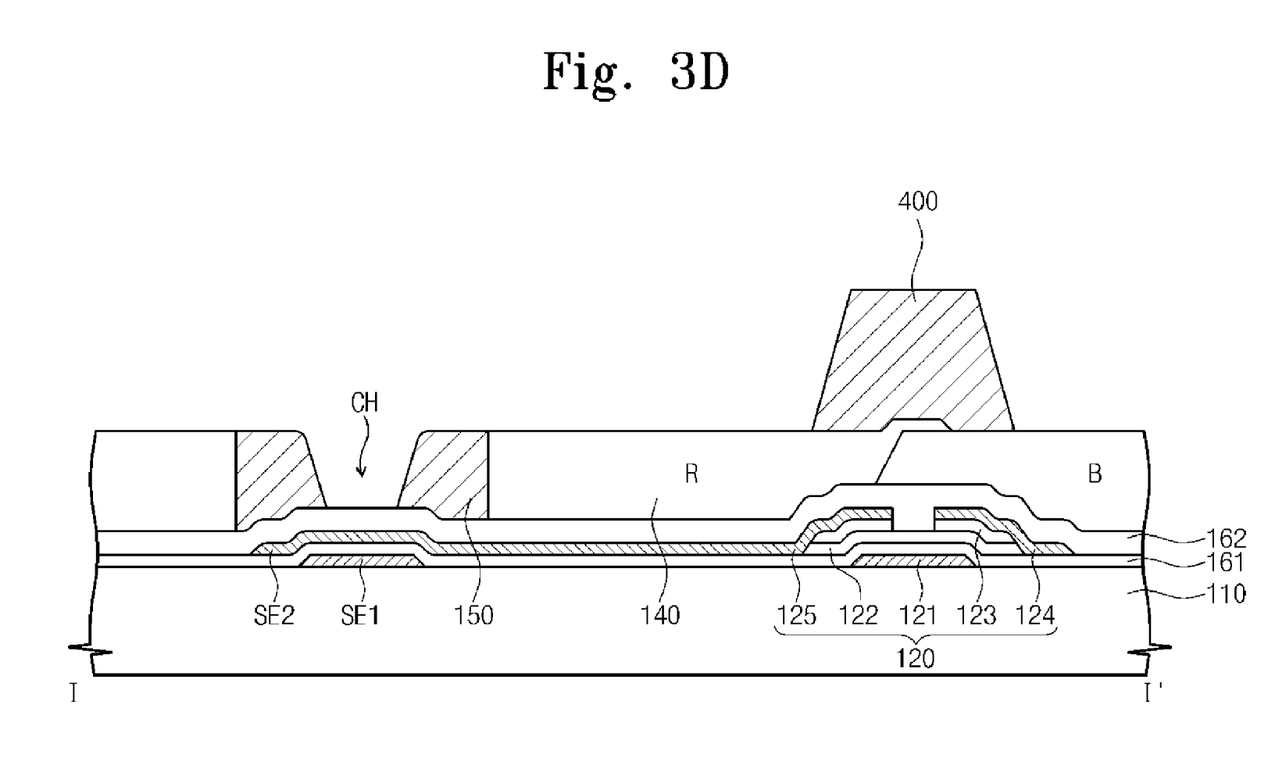

Referring to FIG. 3C and FIG. 3D, a black photoresist layer 10 including a black organic material is deposited on the first base substrate 110 and the opening 141 is filled with the black photoresist layer 10.

Then, the black photoresist layer 10 is patterned to form the black matrix 150 and the spacer 400. While patterning the black photoresist 10, the black matrix 150 is partially removed such that the protective layer 162 is exposed through the removed portion of the black matrix 150. Since the black matrix 150 and the spacer 400 are formed substantially simultaneously through the same process, it may be possible to reduce the number of masks, the number of manufacturing steps, and the manufacturing costs, thereby improving productivity.

Figure 3E:
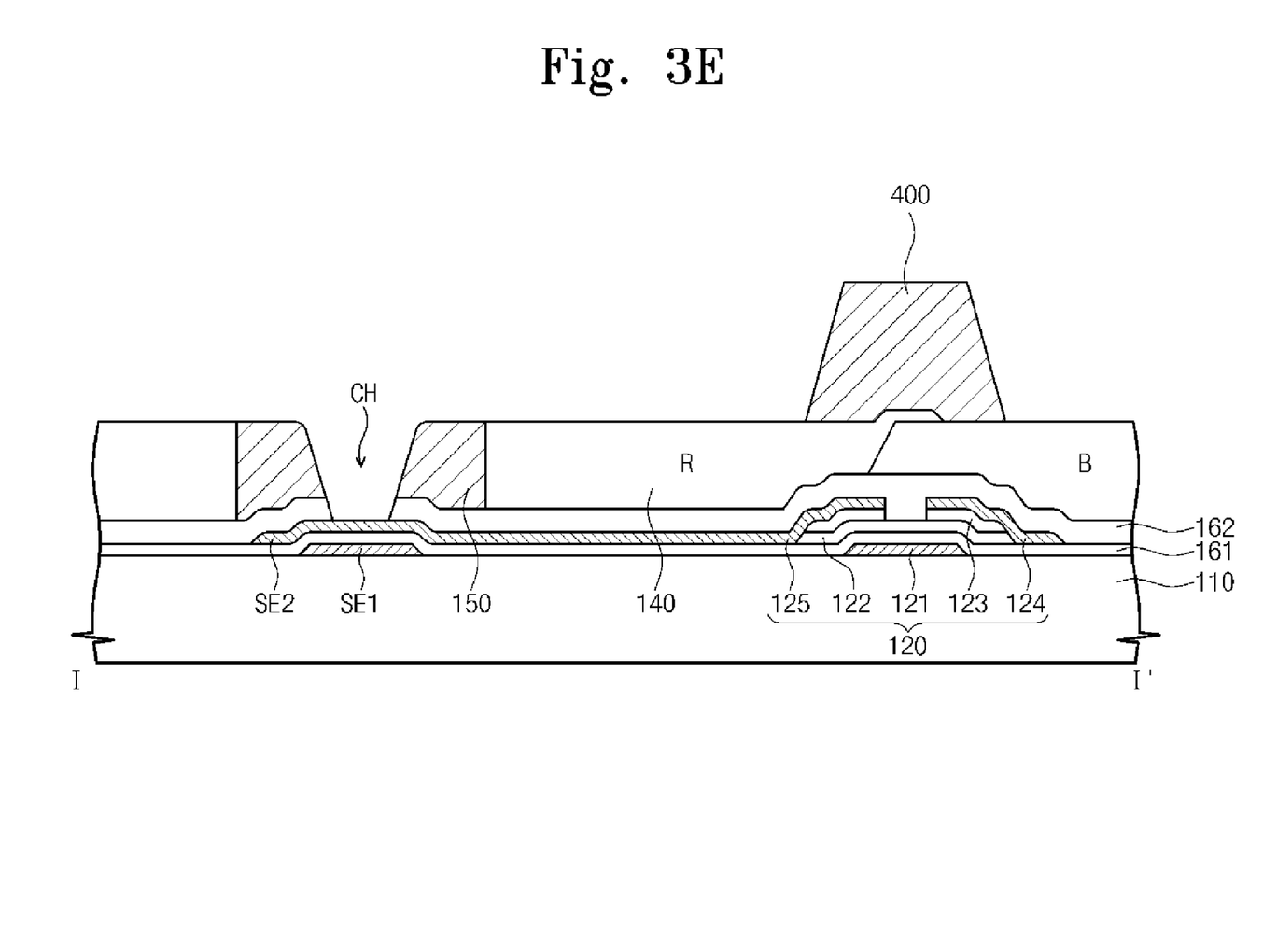

Referring to FIG. 2 and FIG. 3E, the protective layer 162 exposed through the removed portion of the black matrix 150 is removed to form the contact hole CH. Then, the pixel electrode 130 is formed on the color filter 140 and the black matrix 150 such that the pixel electrode 130 contacts the second storage electrode SE2 through the contact hole CH, thereby completing the array substrate 100 and the spacer 400.

Figure 4:
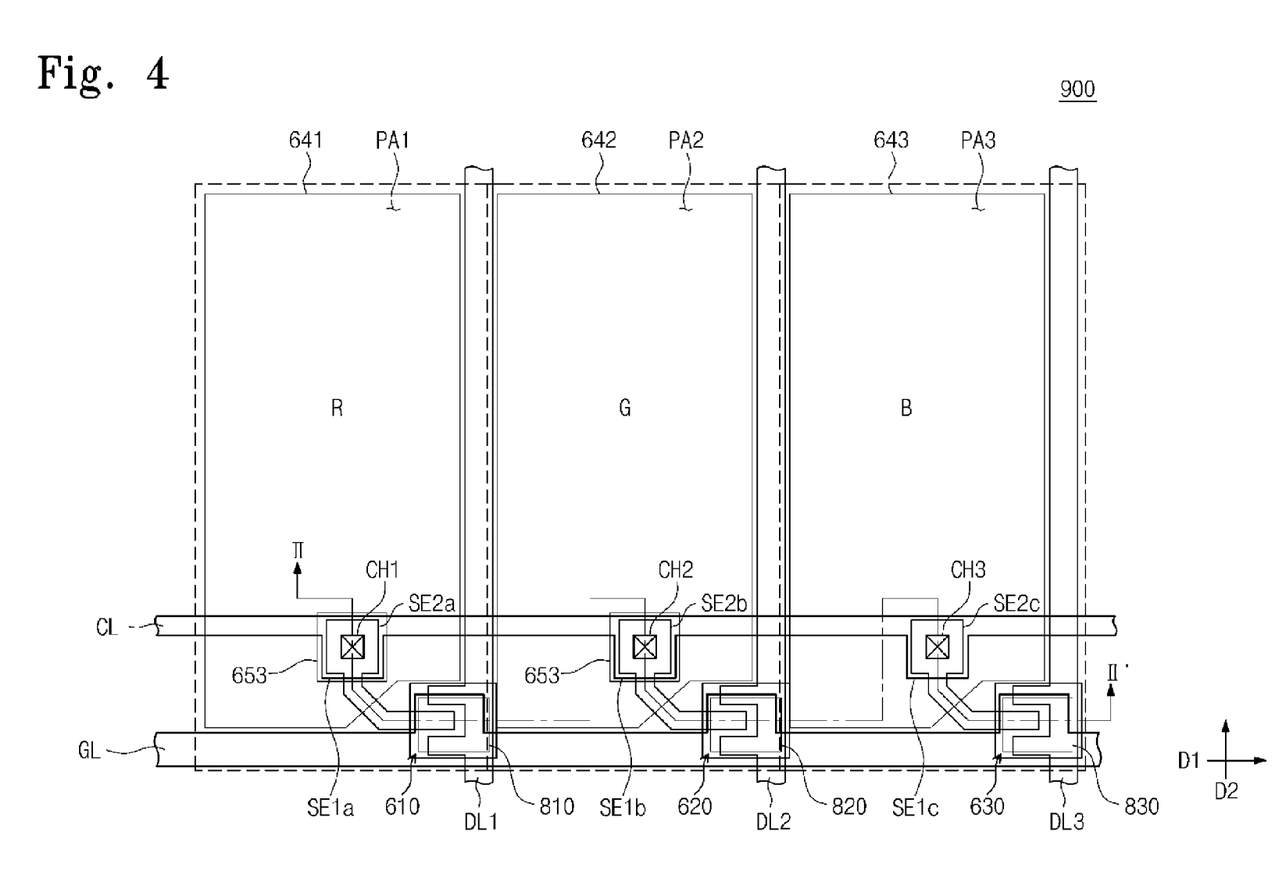
FIG. 4 is a plan view showing a liquid crystal display panel according to another exemplary embodiment of the present invention.
Figure 5:
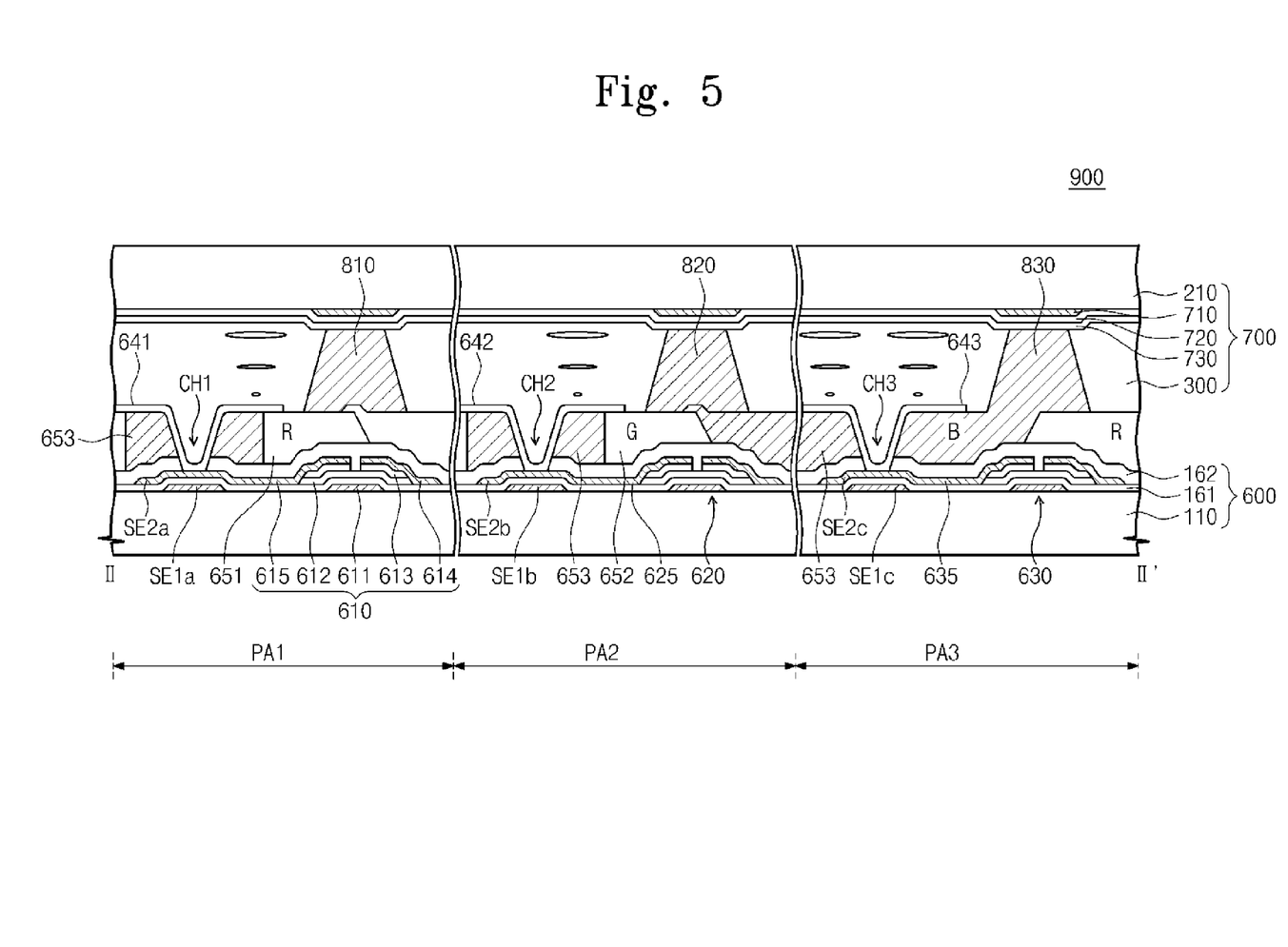
FIG. 5 is a sectional view taken along line II-II' of FIG. 4.

FIG. 4 is a plan view showing a liquid crystal display panel according to another exemplary embodiment of the present invention, and FIG. 5 is a sectional view taken along line II-II' of FIG. 4.

Referring to FIG. 4 and FIG. 5, a liquid crystal display panel 900 includes an array substrate 600, a liquid crystal layer 300, and an opposite substrate 700. In the present exemplary embodiment, the liquid crystal layer 300 has same structure and function as that of the liquid crystal layer in FIG. 2, and thus, the same reference numeral is assigned to the liquid crystal layer and a detailed description of the liquid crystal layer will be omitted.

The array substrate 600 includes a first base substrate 110, a gate line GL, a first data line DL1, a second data line DL2, a third data line DL3, a first thin film transistor 610, a second thin film transistor 620, a third thin film transistor 630, a first pixel electrode 641, a second pixel electrode 642, a third pixel electrode 643, a first color filter 651, a second color filter 652, and a third color filter 653.

The first base substrate 110 includes a first pixel area PA1, a second pixel area PA2, and a third pixel area PA3 on which an image is displayed. The gate line GL formed on the first base substrate 110 extends in a first direction D1. The first, second, and third data lines DL1, DL2, and DL3 are insulated from and cross the gate line GL to define the first, second, and third pixel areas PA1, PA2, and PA3. The first, second, and third data lines DL1, DL2, and DL3 extend in the second direction D2.

The first, second, and third thin film transistors 610, 620, and 630 are formed in the first, second, and third pixel areas PA1, PA2, and PA3, respectively, and are connected to the first, second, and third data lines DL1, DL2, and DL3, respectively. According to the present exemplary embodiment, the first, second, and third thin film transistors 610, 620, and 630 each have the same configuration. Thus, only the first thin film transistor 610 will be described in detail and detailed descriptions of the second and third thin film transistors 620 and 630 will be omitted to avoid redundancy.

The first thin film transistor 610 includes a gate electrode 611 branched from the gate line GL, an active layer 612, and an ohmic contact layer 613 sequentially formed on the gate electrode 611, a source electrode 614 branched from the data line DL1 and formed on the ohmic contact layer 613, and a drain electrode 615 formed from the same layer as the source electrode 614.

The drain electrode 615 of the first thin film transistor 610, the drain electrode 625 of the second thin film transistor 620, and the drain electrode 635 of the third thin film transistor 630 are connected to the first pixel electrode 641, the second pixel electrode 642, and the third pixel electrode 643, respectively, to output a pixel voltage. The first, second, and third pixel electrodes 641, 642, and 643 are formed in the first, second, and third pixel areas PA1, PA2, and PA3, respectively, and each include a transparent conductive material such as ITO or IZO.

The array substrate 600 further includes a gate insulating layer 161 and a protective layer 162 to protect the metal wires. The gate insulating layer 161 is arranged on the first base substrate 110 to cover the gate line GL and the gate electrodes. The protective layer 162 is arranged on the gate insulating layer 161 to cover the first, second, and third data lines DL1, DL2, and DL3 and the first, second, and third thin film transistors 610, 620, and 630.

Also, the array substrate 600 further includes a common voltage line CL, first storage electrodes SE1$a$, SE1$b$, and SE1$c$, and second storage electrodes SE2$a$, SE2$b$, and SE2$c$. The common voltage line CL is formed on the same layer as the gate line GL. The first storage electrodes SE1$a$, SE1$b$, and SE1$c$ are branched from the common voltage line CL and arranged in the first, second, and third pixel areas PA1, PA2, and PA3, respectively. The second storage electrodes SE2$a$, SE2$b$, and SE2$c$ extend from the drain electrodes 615, 625, and 635 of the first, second, and third thin film transistors 610, 620, and 630, respectively, and are arranged on the first storage electrodes SE1$a$, SE1$b$, and SE1$c$, respectively.

The first color filter 651, the second color filter 652, and the third color filter 653 are formed on the protective layer 162. Each color filter 651, 652, and 653 includes a different color and displays the color using light. In the present exemplary embodiment, each color filter 651, 652, and 653 includes a red, green, or blue color filter.

The first color filter 651 is formed in the first pixel area PA1 and is partially removed in the area corresponding to the second storage electrode SE2$a$ of the first pixel area PA1. The second color filter 652 is formed in the second pixel area PA2 and is partially removed in the area corresponding to the second storage electrode SE2$b$ of the second pixel area PA2. The first pixel electrode 641 and the second pixel electrode 642 are formed on the first color filter 651 and the second color filter 652, respectively.

The third color filter 653 covers the entire third pixel area PA3 and is arranged on the storage electrode SE2$a$ of the first pixel area PA1 and the storage electrode SE2$b$ of the second pixel area PA2. The third color filter 653 is arranged partially under the first and second pixel electrodes 641 and 642 in the first and the second pixel areas PA1 and PA2, respectively, and is arranged under the third pixel electrode 643 in the third pixel area PA3. The first and second color filters 651 and 652 surround the third color filter 653 in the first and the second pixel areas PA1 and PA2, respectively, in a plan view.

The third color filter 653 and the protective layer 162 are partially removed to form contact holes CH1, CH2, and CH3. The contact holes CH1, CH2, and CH3 are formed in the first, second, and third pixel areas PA1, PA2, and PA3, respectively, and the second storage electrodes SE2a, SE2b, and SE2c are exposed through the contact holes CH1, CH2, and CH3, respectively. The first, second, and third pixel electrodes 641, 642, and 643 are connected to the second storage electrodes SE2a, SE2b, and SE2c through the contact holes CH1, CH2, and CH3, respectively, thereby connecting the first, second, and third pixel electrodes 641, 642, and 643 and the first, second, and third thin film transistors 610, 620, and 630, respectively.

As described above, the third color filter 653 is formed in each of the first, second, and third pixel areas PA1, PA2, and PA3 and is partially removed to form the contact holes CH1, CH2, and CH3. Thus, the contact holes CH1, CH2, and CH3 are the same size to prevent the first, second, and third pixel electrodes 641, 642, and 643 from being insulated from the second storage electrodes SE2a, SE2b, and SE2c, thereby improving product yield.

The opposite substrate 700 is arranged on the array substrate 600. The opposite substrate 700 includes a second base substrate 210 facing the first base substrate 110, a black matrix 710 arranged on the second base substrate 210, an overcoat layer 720 arranged on the second base substrate 210 to cover the black matrix 710, and a common electrode 730 formed on the overcoat layer 720.

The black matrix 710 is arranged corresponding to the first, second, and third thin film transistors 610, 620, and 630 and blocks the light. The black matrix 710 may include an organic material or a metallic material to block the light.

The liquid crystal display panel 900 further includes spacers 810, 820, and 830 to maintain a cell gap between the array substrate 600 and the opposite substrate 700. The spacers 810, 820, and 830 are interposed between the array substrate 600 and the opposite substrate 700 and include the same material as the third color filter 653. The spacers 810, 820, and 830 are formed through the same process as the third color filter 653 and thus, are formed substantially simultaneously with the third color filter 653. Thus, the number of masks, the number of manufacturing steps, and the manufacturing costs may be reduced, thereby improving productivity.

FIG. 6A, FIG. 6B, FIG. 6C, FIG. 6D, and FIG. 6E are sectional views showing a method of manufacturing the array substrate and the spacer shown in FIG. 5.

Figure 6A:
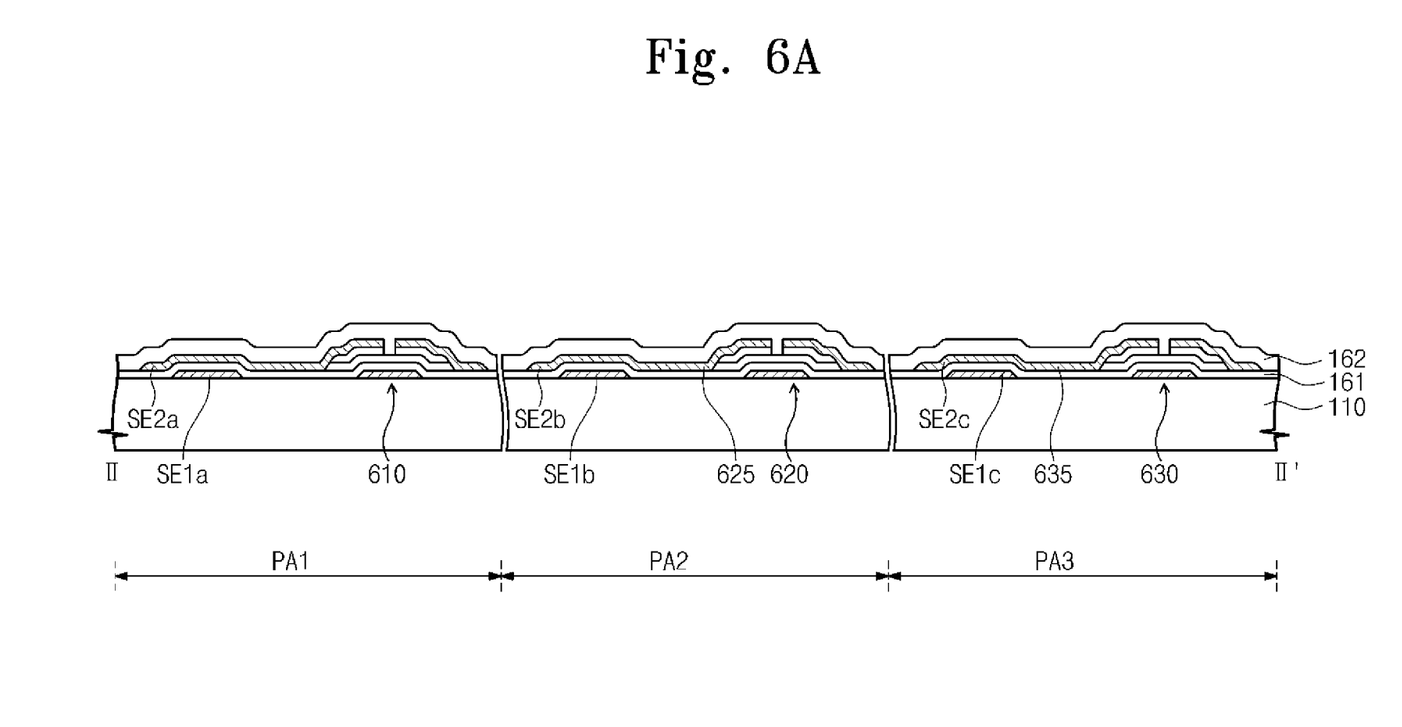
FIG. 6A, FIG. 6B, FIG. 6C, FIG. 6D, and FIG. 6E are sectional views showing a manufacturing process of an array substrate and a spacer shown in FIG. 5.

Referring to FIG. 6A, the first, second, and third thin film transistors 610, 620, and 630, the gate insulating layer 161, and the first and second storage electrodes SE1a, SE1b, SE1c, SE2a, SE2b, and SE2c are formed on the first base substrate 110. The protective layer 162 is also formed on the first base substrate 110 to cover the first, second, and third thin film transistors 610, 620, and 630, the gate insulating layer 161, and the first and second storage electrodes SE1a, SE1b, SE1c, SE2a, SE2b, and SE2c.

Figure 6B:
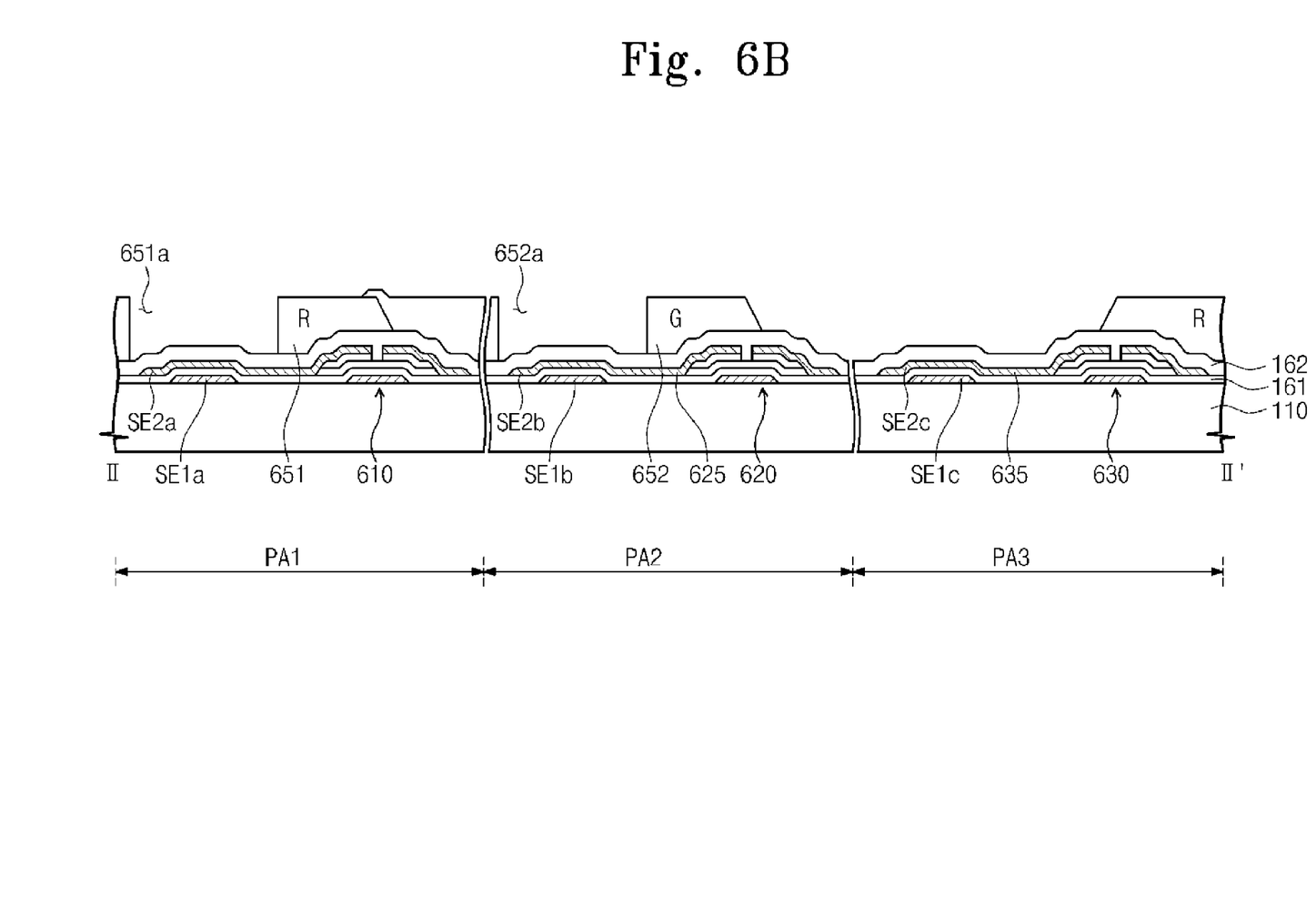

Referring to FIG. 6B, a first photoresist layer (not shown) is deposited on the protective layer 162 and patterned to form the first color filter 651 in the first pixel area PA1. While patterning the first photoresist layer, the first color filter 651 is partially removed in the area corresponding to the second storage electrode SE2a of the first pixel area PA1 to form an opening 651a.

Then, a second photoresist layer (not shown) is deposited on the protective layer 162 and patterned to form the second color filter 652 in the second pixel area PA2. While patterning the second photoresist layer, the second color filter 652 is partially removed in the area corresponding to the second storage electrode SE2b of the second pixel area PA2 to form an opening 652a.

Figure 6C:
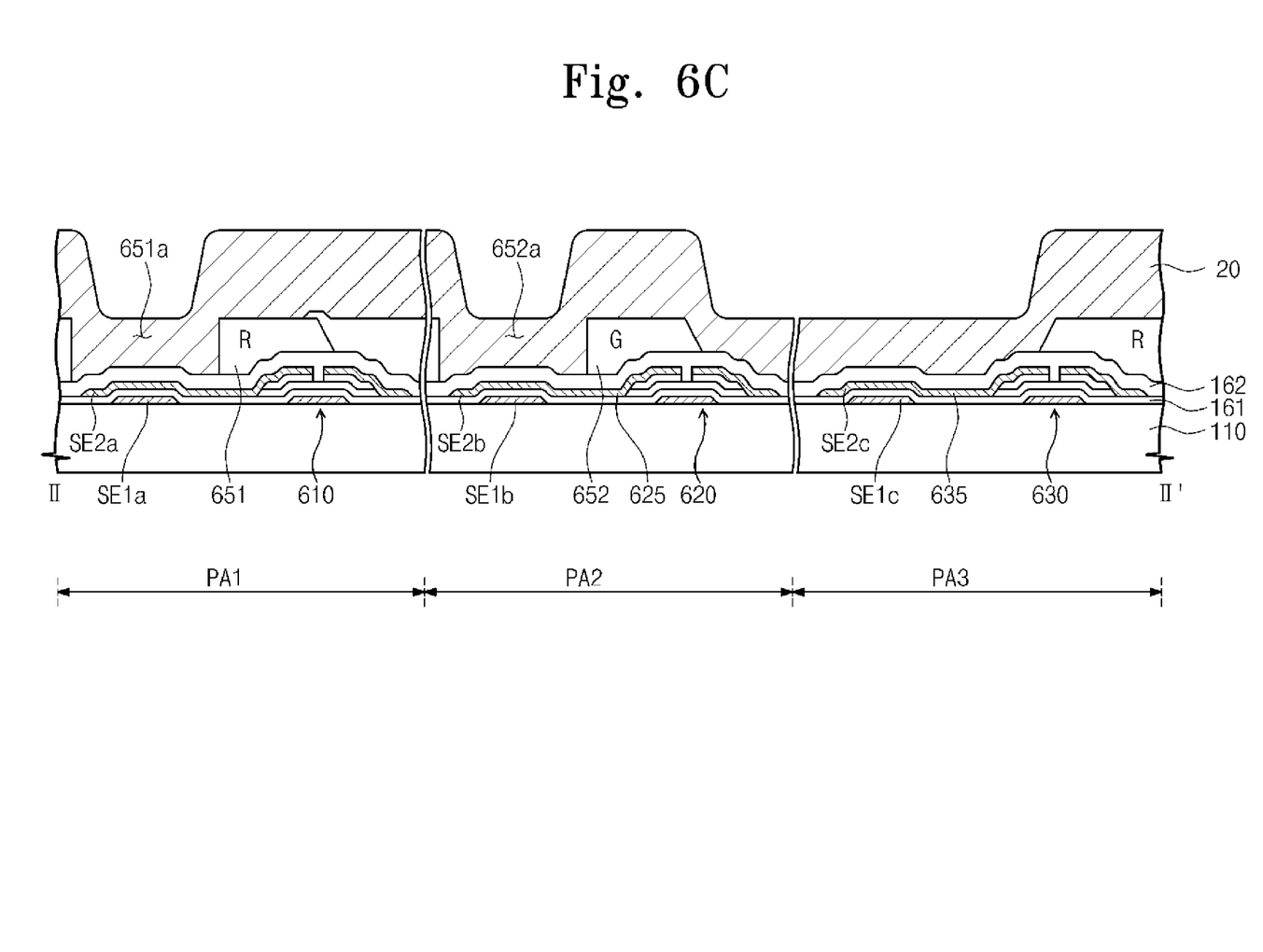
Figure 6D:
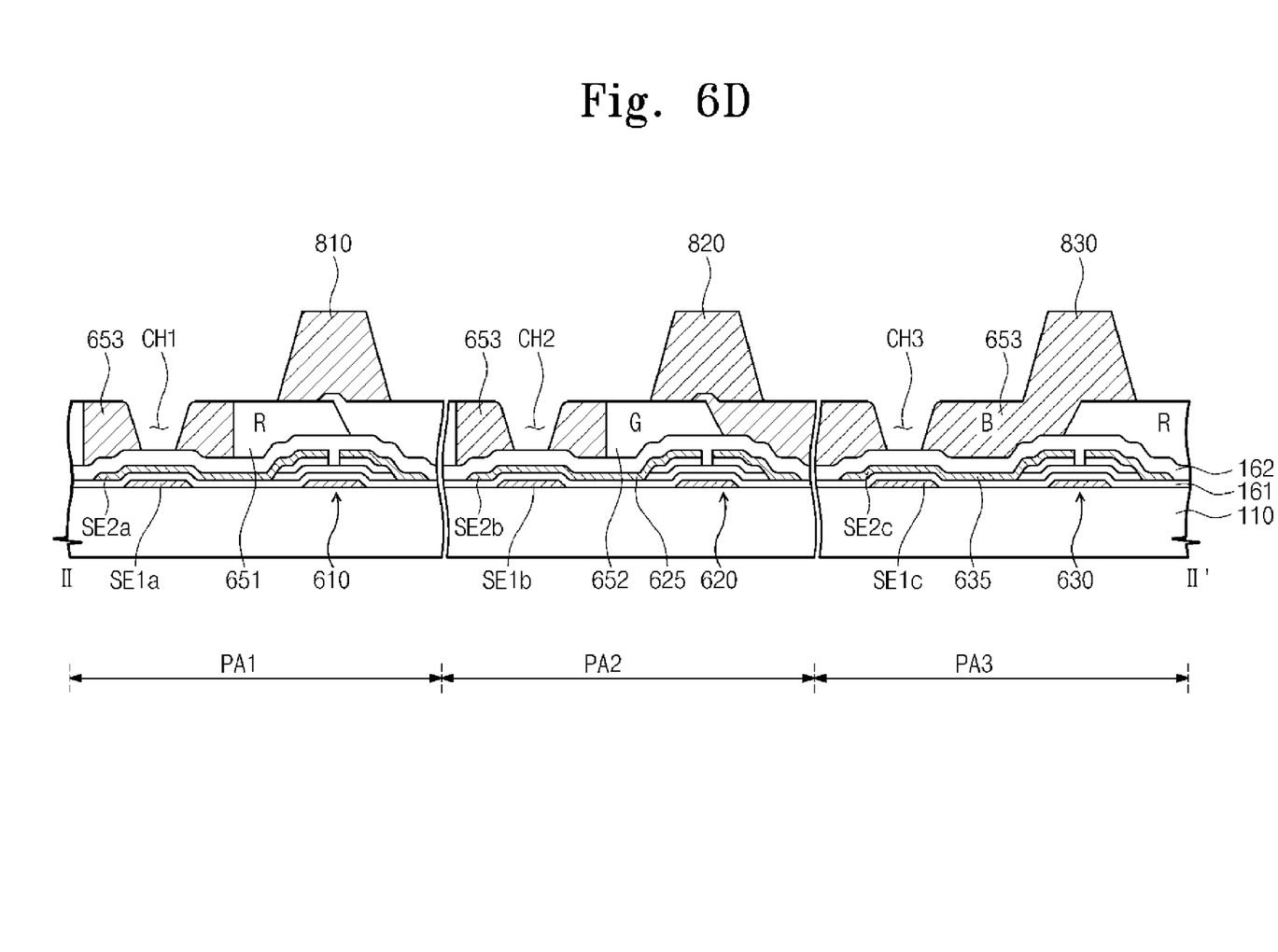

Referring to FIG. 6C and FIG. 6D, a third photoresist layer 20 is deposited on the protective layer 162. The openings 651a and 652a formed through the first color filter 651 and the second color filter 652, respectively, are filled with the third photoresist layer 20.

Then, the third photoresist layer 20 is patterned to form the third color filter 653 and the spacers 810, 820, and 830. While patterning the third photoresist layer 20, the third color filter 653 is partially removed on the second storage electrodes SE2a, SE2b, and SE2c to form the contact holes CH1, CH2, and CH3. Since the third color filter 653 and the spacers 810, 820, and 830 are formed substantially simultaneously through the same process, it may be possible to reduce the number of masks, the number of manufacturing steps, and the manufacturing costs, thereby improving productivity.

Figure 6E:
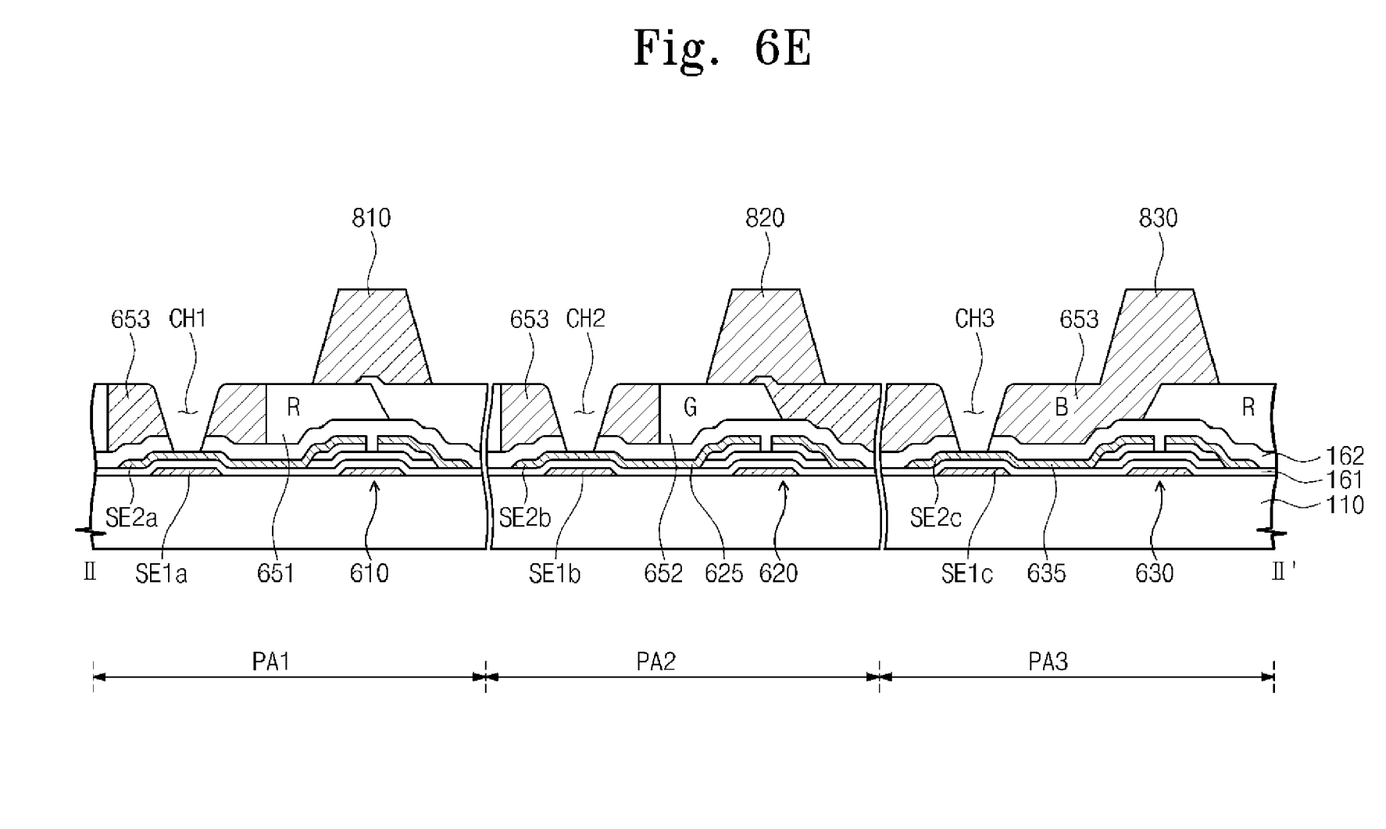

Referring to FIG. 5 and FIG. 6E, the protective layer 162 is partially removed to form the contact holes CH1, CH2, and CH3. Then, the first, second, and third pixel electrodes 641, 642, and 643 are formed, completing the array substrate 600 and the spacers 810, 820, and 830.

According to the above, the array substrate may include color filters having two or more colors, and the black matrix may be partially removed to form a contact hole in each pixel area. Thus, the contact holes have the same size, and the pixel electrode is connected to the thin film transistor, which may improve product yield.

Also, the black matrix and the spacer of the liquid crystal display panel are formed substantially simultaneously through the same process using the same material, so that the number of masks, the number of manufacturing steps, and the manufacturing costs may be reduced, thereby improving productivity.

The array substrate may include color filters that display an image and the color filters may be formed in corresponding pixel areas. Each color filter is partially removed to form a contact hole in each pixel area. Thus, it may be possible to prevent the pixel electrode from being insulated from the thin film transistor, thereby improving product yield.

Also, since the color filter, through which the contact hole is formed, and the spacer of the liquid crystal display panel are formed substantially simultaneously through the same process using the same material, it may be possible to reduce the number of masks, the number of manufacturing steps, and the manufacturing costs, thereby improving productivity.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a display panel, comprising:
    forming a thin film transistor, a first storage electrode, and a second storage electrode in a pixel area of a first base substrate, the second storage electrode being branched from a drain electrode of the thin film transistor and disposed on the first storage electrode;
    forming a color filter in the pixel area;
    removing the color filter formed on the second storage electrode;
    forming a black matrix on the second storage electrode, the black matrix being provided with a contact hole;

forming a pixel electrode on the color filter and the black matrix such that the pixel electrode is connected to the second storage electrode through the contact hole;

forming a common electrode on a second base substrate; and coupling the first base substrate with the second base substrate.

2. The method of claim 1, wherein forming a black matrix comprises:

forming a black photoresist layer on the first base substrate; and patterning the black photoresist layer to form the black matrix and the contact hole.

3. The method of claim 2, further comprising forming a spacer on the thin film transistor to maintain a cell gap between the first base substrate and the second base substrate, the spacer being formed before the pixel electrode.

4. The method of claim 3, wherein the spacer is formed substantially simultaneously with the black matrix.

5. A method of manufacturing a display panel, comprising:

forming a thin film transistor in each of a first pixel area, a second pixel area, and a third pixel area defined on a first base substrate;

forming a first color filter in the first pixel area, the first color filter comprising a first opening;

forming a second color filter in the second pixel area, the second color filter comprising a second opening;

forming a third color filter in the first opening of the first color filter and the second opening of the second color filter and in the third pixel area, the third color filter comprising a contact hole in each pixel area;

forming a pixel electrode on the first color filter, the second color filter, and the third color filter such that the pixel electrode is connected to the thin film transistor through the contact hole;

forming a common electrode on a second base substrate; and coupling the first base substrate with the second base substrate.

6. The method of claim 5, wherein forming the third color filter comprises:

forming a photoresist layer on the first base substrate; and patterning the photoresist layer to form the third color filter and the contact hole in each pixel area.

7. The method of claim 6, further comprising forming a spacer on the thin film transistor to maintain a cell gap between the first base substrate and the second base substrate before forming the pixel electrode.

8. The method of claim 7, wherein the spacer is formed substantially simultaneously with the third color filter.

9. The method of claim 8, further comprising forming a black matrix between the pixel areas on the second base substrate before forming the common electrode.

10. The method of claim 5, further comprising forming a first storage electrode and a second storage electrode in each pixel area before forming the first color filter, wherein the second storage electrode extends from a data electrode of the thin film transistor.

11. The method of claim 10, wherein the third color filter is formed on the second storage electrode in the first pixel area and in the second pixel area, and the second storage electrode is connected to the pixel electrode through the contact hole.

12. The method of claim 5, wherein the color filters each have a different color.

* * * * *